No. 763,677. PATENTED JUNE 28, 1904.
C. A. KOCAB.
NUT LOCK.
APPLICATION FILED APR. 16, 1904.
NO MODEL.

Witnesses:

Inventor
C. A. Kocab,

No. 763,677. Patented June 28, 1904.

UNITED STATES PATENT OFFICE.

CHARLES A. KOCAB, OF ALLEGHENY, PENNSYLVANIA.

NUT-LOCK.

SPECIFICATION forming part of Letters Patent No. 763,677, dated June 28, 1904.

Application filed April 16, 1904. Serial No. 203,451. (No model.)

*To all whom it may concern:*

Be it known that I, CHARLES A. KOCAB, a citizen of the United States of America, residing at Allegheny, in the county of Allegheny and State of Pennsylvania, have invented certain new and useful Improvements in Nut-Locks, of which the following is a specification, reference being had therein to the accompanying drawings.

This invention has relation to nut-locks, and has for its object the provision of novel means for securely locking a nut upon a bolt so that there can be absolutely no movement of the nut or bolt relatively to one another while the locking device is in position.

I propose to use my improvement in connection with nuts and bolts of the ordinary character, and in carrying my invention into effect I apply the locking device to the nut and bolt after the same have been placed in position, so that my device is applicable to nuts and bolts already in place and is therefore preferable to those devices in which the locking means must be applied simultaneously with the placing of the nut on the bolt.

Briefly described, my invention consists in a single plate of metal so formed and fashioned that it will embrace the nut on all sides and will rigidly engage the bolt on the outside of the nut, so that it will be impossible to turn either the nut or the bolt without destroying the integrity of the plate or of the bolt.

Figures 1, 2:
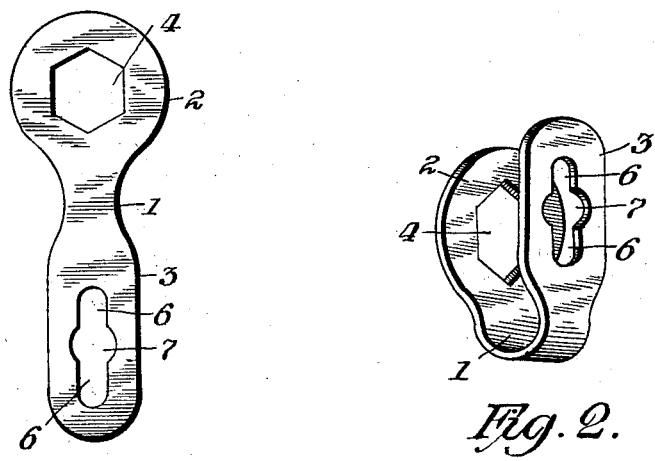
Figure 3:
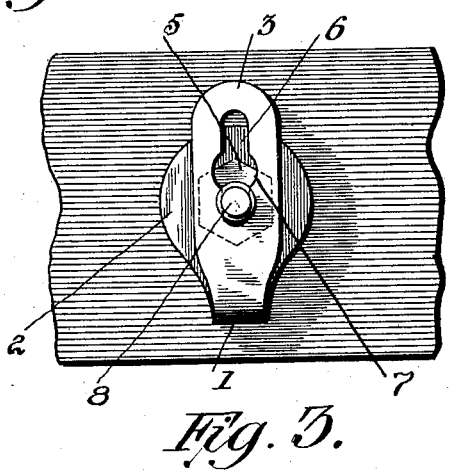

In the accompanying drawings, wherein I have illustrated my improvement, Figure 1 is a plan view of a plate which when applied as hereinafter described constitutes the entire nut-lock. Fig. 2 is a perspective view of the same plate bent to the form which it is made to assume when applied in position on the nut and the bolt, and Fig. 3 is a plan view showing the nut-lock in position on a nut and bolt of ordinary form.

The plate 1, of steel, is stamped from a sheet, the exterior contour of the plate being of any desired character, but preferably substantially that shown in the drawings—that is, with one end enlarged, as shown at 2, and with a tongue 3. A hole 4 is formed in the enlarged end 2, said hole being of a size and shape to accommodate the nut to which the plate is to be applied, the hole shown in the drawings being six-sided, so that it will accommodate the six-sided nut 5. (Shown in Fig. 3.) The tongue 3 is formed with a longitudinal slot 6, which is enlarged at its center, as shown at 7, such enlargement being of a size to permit of the passage therethrough of a bolt 8, to which the nut 5 is applied. The slot 6 is of a width somewhat less than the diameter of the bolt, or at least of the distance from the outside of the thread on one side of the bolt to the outside of the thread on the other side of the bolt.

The plate constructed as above described and as shown in the drawings is either applied in position on the nut while straight, as shown in Fig. 1, or it may be first bent to the position shown in Fig. 2, the latter being the preferable manner of treating the plate, the bending being effected in such manner that the center of the enlargement 7 will after the plate has been bent be in alinement with the center of the hole 4. The plate is applied to the nut and the bolt by passing the plate over the end of the bolt, allowing the nut to enter the hole 4 and the bolt to enter the enlargement 7 of the slot 6. After the plate has been placed in position in the above manner the tongue 3 is driven upwardly, so that the edges of the lower portion of the slot 6 will cut into the threads of the bolt and bite the same, thus preventing the plate from being turned, or, if desired, the tongue may be driven downwardly, in which event the edges of the upper portion of the slot 6—that is, that portion which is uppermost when the plate is in the position Fig. 3 will be caused to cut into the threads of the bolt in the same manner. If desired or necessary, the plate may be removed from engagement with the bolt by driving the tongue 3 in a direction opposite to that in which it was driven to cause the edges of the slot to cut into the threads of the bolt, thus driving the enlargement 7 into alinement with the bolt and permitting the plate to be removed and the nut to be turned.

Having described my invention, I claim—

A nut-lock consisting of a plate having a hole adapted to receive a nut, and a tongue having a longitudinally-disposed slot with an enlargement at one point, said enlargement being adapted to receive a bolt and said slot being of a width less than the extreme diameter of the bolt.

In testimony whereof I affix my signature in the presence of two witnesses.

CHARLES A. KOCAB.

Witnesses:
H. C. EVERT,
E. E. POTTER.